3,289,894
FEEDING DEVICE FOR CYCLONE SEPARATORS
Jan N. J. Leeman, Brunssum, Netherlands, assignor to
Stamicarbon N.V., Heerlen, Netherlands
Filed Oct. 21, 1963, Ser. No. 317,694
Claims priority, application Netherlands, Oct. 22, 1962,
284,596
3 Claims. (Cl. 222—145)

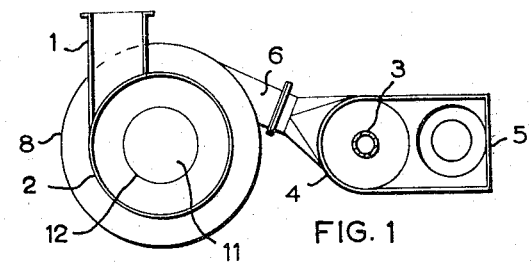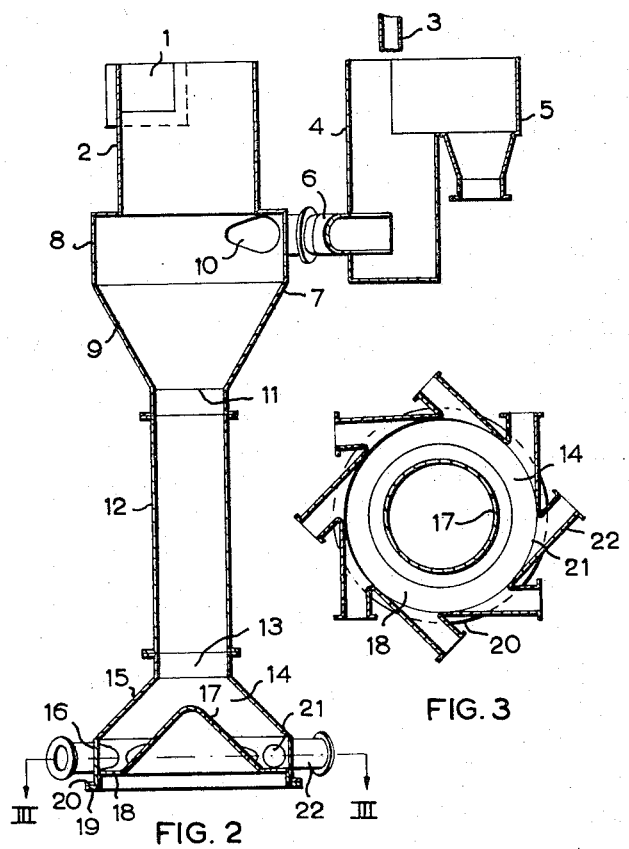

The present invention relates to improvements in feeding devices for cyclone type separators. More particularly, the present invention relates to an improved feeding device for feeding, under constant pressure, a mixture of particles and a separatory liquid to a plurality of hydrocyclones for separation of the particles.

Feeding devices of the present sort are known, for example, from Netherlands patent specification No. 96,726 which shows a device for feeding a mixture of particles to be separated, together with a separatory liquid, to hydrocyclones under a constant pressure. This known device consists of two vessels which are mounted above the cyclones, the first vessel being provided with a supply conduit for a portion of the separatory liquid, and an overflow. The first vessel is in open communication with the second vessel and the second vessel is provided with a supply conduit for the particles to be separated, along with the remainder of the separatory liquid, and with a discharge conduit which is in open communication with the hydrocyclones.

This known device possesses some disadvantages however, principally because it is not well suited for simultaneously feeding the particles and liquid to two or more hydrocyclones. For example, if in the interest of economy, a number of cyclones are connected to the discharge pipe of the known feeding device, there arises a nonhomogeneity of feed, for both the quantity and the composition of the mixture supplied to the cyclones prove to be dissimilar in the case of each cyclone. Consequently, the composition of the feed to the several cyclones will differ from that of the mixture supplied to the feeding device, while the quantity of the feed in each cyclone will deviate from that calculated from the total feed and the number of cyclones. As the quantity and the composition of the mixture supplied to the feeding device have been so chosen that the separation will be effected under the most favorable conditions, the separation will be poorer when a number of cyclones are fed by a joint feeding device of the sort presently known since the cyclones will be differently loaded, than when all cyclones are equally loaded from separate feeding devices, an obviously more expensive and therefore undesirable solution.

It is therefore a principal object of this invention to overcome the objectionable features of known feeding devices and provide a feeding device that will supply liquid and particulate materials to a plurality of hydrocyclone separators in a homogeneous fashion.

It is another object of this invention to provide an improved device for equally feeding a plurality of hydrocyclone separators from a common supply tank.

Other and further objects of this invention will become apparent to those skilled in the art when reference is had to the following description and drawings.

The objects of the present invention are accomplished by first providing a feeding device of the sort known having a plurality of hydrocyclones and a plurality of vessels mounted thereabove, a first vessel being provided with a supply conduit for a portion of separatory liquid and an overflow, and the first vessel being in open communication with a second vessel. The second vessel is provided with a supply conduit for the remainder of the separatory liquid and the particles to be separated, as well as a discharge conduit which is in open communication with the hydrocyclones. In order to equally and homogeneously load the hydrocyclones from a joint supply tank by the improvement according to the invention, the first vessel provided with an overflow is adapted to communicate with the second vessel by means of a conduit arranged for tangential debouching or discharging into the second vessel. Also according to the improvement of the present invention, the discharge conduit of the second vessel is arranged to centrally debouch or discharge into a radially symmetrical vortex chamber which, at its periphery, is provided with a number of tangential discharge pipes which can be connected to the hydrocyclones.

Owing to the separatory liquid being tangentially fed into the second vessel to which the particles to be separated are supplied, a rotary current is produced which propagates into the vortex chamber. As a result, the mass moving near the circumference of this chamber has a constant composition. By peeling off equal quantities of this mass via the tangential discharge pipes at a number of points equally distributed over the chamber circumference, all the hydrocyclones connected to these conduits are equally loaded, so that an optimum separation is achieved.

Preferably, a central core is fitted to the bottom of the vortex chamber. As a result, the formation of centripetal currents in this chamber is prevented. This effect can be further increased by giving the core and the wall of the vortex chamber the shape of cones, the apices of which point upwards. This will give an annular vortex chamber, the diameter of which increases towards the base and the inner cone of which prevents the formation of a return vortex, such as is normally produced in cyclones.

The desired rotary current can be further increased by making the feed pipe for the particles to be separated and the separatory liquid also discharge or debouch tangentially into the second vessel. Naturally, the direction of the tangential feed and discharge pipes should correspond to the direction of rotation of the mixture in the apparatus.

The invention will be further illustrated with reference to a preferred embodiment shown in the drawings in which:

FIGURE 1 is a top view of a feeding device according to the invention;

FIGURE 2 is a longitudinal section of the device shown in FIGURE 1; and

FIGURE 3 is a cross-sectional view taken along the line III—III of FIGURE 2.

Referring now to FIGURE 1 of the drawings, a suitable feed to be separated, consisting for example of an amount of separatory liquid such as in a magnetite suspension, together with the particles to be separated, e.g., raw coal, is tangentially fed into a cylindrical second vessel 2 through a conduit 1. Another portion of the separatory liquid is fed into a first vessel 4 through a conduit 3. The latter vessel is provided with an overflow 5 and communicates, via a conduit 6, with a reservoir 7 (FIGURE 2) which is in open communication with the second vessel 2 and is positioned centrally under this vessel. As a result, the liquid in the second vessel 2 will be at a constant level, which is determined by the overflow 5.

Turning now to FIGURE 2, the reservoir 7 is composed of a cylindrical upper part 8 and a subjacent conical part 9. Conduit 6 tangentially discharges into the cylindrical part 8, by way of an opening 10, so that a rotary current is produced in reservoir 7 by the liquid introduced through the conduit 6. Preferably, the supply conduit 1 is also adapted to discharge tangentially into the second vessel 2 in such a way that the resulting rotary current has the same direction as that produced in reservoir 7.

A discharge tube 12 of circular section is coaxially connected to the opening 11 in the apex of reservoir 7, so that the rotary current propagates into this tube. The tube 12 centrally discharges into a vortex chamber 14 by way of an opening 13. The outer wall 15 of the vortex chamber has the shape of a truncated cone, the apex of which points upwards and the base of which connects with a cylindrical wall 16. The bottom of the vortex chamber 14 is formed by a central cone 17, the apex of which points upwards, and a flat, annular bottom plate 18 is connected to this cone and, by means of a flange 19, to the flange 20 of the cylindrical wall 16. As a result, the vortex chamber has an annular section, the inner and the outer diameters of which increase towards the base. At equal intervals, the cylindrical wall is provided with openings 21 (FIGURE 3) connecting with discharge pipes 22 which are fitted tangentially to the vortex chamber in such a way that, as viewed in the direction of the tangential component of the rotary current, they are directed away from the vortex chamber.

In operation, a rotary current can continue to flow freely and undisturbed in the vortex chamber 14, so that any fractions removed from the chamber through the various discharge pipes 22 are equal in composition and quantity. The hydrocyclones (not shown) connected to the discharge pipes will consequently be equally loaded.

The pressure of the supply to the cyclones is determined by the height of the overflow 5 above the supply openings of the cyclones and may be for example from 15 to 18 feet, corresponding to a hydrostatic pressure of from 9 to 11 p.s.i. respectively depending on the pulp density. The amount of liquid supplied to vessel 4, for example from 180,000 to 210,000 gal. per hour, must be larger than the amount of overflowing liquid for example, from 90,000 to 105,000 gal. per hour, so that a current directed towards reservoir 7 will be formed in conduit 6 to produce the desired rotary current in reservoir 7 and prevent particles of the material to be separated from getting into vessel 4. The rate of flow of the liquid, for example from 50 to 60 feet per minute, in vessel 2 and reservoir 7 must furthermore be such that particles of the material to be separated, when having a lower specific gravity than the separatory liquid, are prevented from floating in vessel 2. A suitable example would be particles having specific gravity within the range of 1.25 to 2.7 and separatory liquid having specific gravity of 1.25 to 1.9. It will be apparent that both lighter and heavier particles and liquids can also be employed. The desired rate of flow, preferably in the range of 50 to 70 feet per minute, can be obtained choosing suitable dimensions of the feeding device at a given capacity of the device.

In the case of a linear or streamline flow, the rate of flow of the liquid is determined by the quotient of the capacity and the sectional area of the device. In the case of a rotary flow, however, the liquid follows a spiral path, which is of course, longer than the straight one. This means that at the same capacity of the device, the rate of flow of the liquid is higher in the latter (spiral) case than in the former (streamline flow), so that the opportunity for particles of low specific gravity to float is greatly diminished. Consequently, if the device according to this invention is utilized, the need for restricting operations to certain specified dimensions is less stringent than if the known construction is used.

It will therefore be apparent that various modifications may be made in the foregoing description without departing from the spirit of the present invention. Accordingly, this invention is only to be limited to the extent shown by the following claims.

What is claimed is:

1. In a device for feeding a mixture of particles to be separated and a separatory liquid to a plurality of hydro-cyclones under a constant pressure wherein first and second vessels are mounted above the cyclones and include first conduit means communicating with the first vessel for supplying a first portion of the separatory liquid to the device from exteriorly of the first vessel, second conduit means communicating with the first vessel for directing an overflow from the first vessel and third conduit means communicating between said first vessel and said second vessel for delivering separatory liquid from the first vessel to the second vessel, and further including fourth conduit means communicating with the second vessel for supplying the particles to be separated and a second portion of the separatory liquid to the device from exteriorly of the second vessel, and a discharge conduit communicating at one end thereof with the second vessel and in open communication at the other end thereof with the plurality of hydro-cyclones for directing the first and second portions of the separatory liquid and the particles to be separated, combined, to the plurality of hydro-cyclones, the improvement comprising: said third conduit means being arranged to discharge material tangentially into said second vessel; said discharge conduit other end opening into and in communication with means defining a radially symmetrical vortex chamber; and means defining a plurality of angularly spaced tangentially directed outlet pipes communicating at the radially inner ends thereof with said vortex chamber at the periphery thereof; said outlet pipes projecting in the same tangential sense as said third conduit means, the outlet pipes being constructed and arranged for connection to the plurality of hydro-cyclones as the inlet means thereto.

2. A device according to claim 1 wherein said discharge conduit extends substantially vertically and said one end thereof communicates with the second vessel along the longitudinal axis of the second vessel; said vortex chamber includes a conically curved upper wall, a conically curved bottom wall and a side wall extending between the outer periphery of the upper wall and the outer periphery of the lower wall, said outlet pipes communicating with the vortex chamber through said sidewall; the upper wall, bottom wall, and side wall being coaxial with said discharge conduit and said upper wall and bottom wall decreasing in diameter upwardly.

3. A device according to claim 1 wherein said fourth conduit means communicates with the second vessel tangentially thereof in the same tangential sense as said third conduit means.

References Cited by the Examiner

UNITED STATES PATENTS

| 2,799,208 | 7/1957 | Scott | 210—512 X |
| 2,849,930 | 9/1958 | Freeman et al. | 209—211 X |
| 3,207,310 | 9/1965 | Yesberger | 210—512 X |

FOREIGN PATENTS

| 419,071 | 11/1934 | Great Britain. |
| 96,726 | 1/1961 | Netherlands. |

REUBEN FRIEDMAN, *Primary Examiner.*

J. DE CESARE, *Assistant Examiner.*